March 10, 1942.    J. BIJUR    2,276,145
LUBRICATION
Filed Oct. 9, 1934
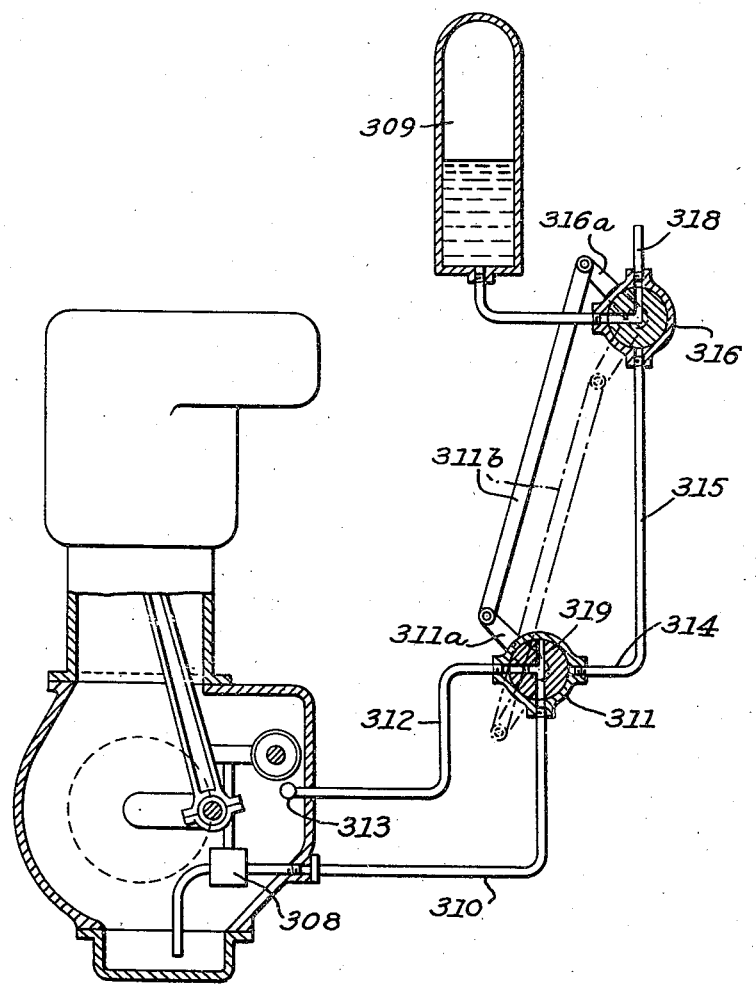
Inventor.
JOSEPH BIJUR, DECEASED
GEORGE BIJUR, EXECUTOR
By Dean, Fairbank, Hirsch & Foster
Attorneys.

Patented Mar. 10, 1942

2,276,145

UNITED STATES PATENT OFFICE 2,276,145

LUBRICATION

Joseph Bijur, deceased, late of New York, N. Y., by George Bijur, executor, New York, N. Y., assignor to Auto Research Corporation, a corporation of Delaware Application October 9, 1934, Serial No. 747,501

1 Claim. (Cl. 184—7)

The present invention is concerned with fluid distributing installations and methods, and while of more general utility, is shown in a special application to chassis and other machine lubrication where bearings are to be supplied with relatively small accurately determined quantities of lubricant.

It is among the objects of the invention to provide an installation and a method of the above character, by which lubricant is supplied to bearings of a vehicle or other mechanism or installation, in accordance with the requirements thereof during operation.

With machines of the character described, as with an automobile, there are sometimes provided sources of lubricant pressure (the engine oil pump) which would normally supply lubricant to bearings either continuously and/or at a certain pressure range, when it is desirable to supply the bearings intermittently or at a different pressure range and another object is to provide automatic means in a system of the character referred to, for feeding a drip plug system intermittently and/or at a predetermined pressure range from a source of lubricant which may feed at a different pressure range and/or continuously.

Another object is to provide an installation of the above type functioning in the course of normal operation of the machine or vehicle, without the exercise of conscious attention on the part of the operator.

Another object is to provide an installation and a method of the above type, which will function without the need for any special precautions or adjustments to assure approximately the same feed of substantially any grade of lubricant, without over-oiling in hot weather or under-oiling in cold.

In issued Patent No. 1,632,771, of June 14, 1927, there is specifically disclosed a centralized system embodying a pump of substantial volume, the rate of the slow discharge of which under the sustained effort of a discharging spring is controlled through the intervening oil-filled piping by calibrated drip plug outlets of high resistance to flow.

According to the specific disclosure of the said patent, intervals of some hours may intervene between successive pump operations, the pump having sufficient volume to supply to the bearings more than their current requirements of lubricant, that it, sufficient for hours of vehicle operation after the pump has completed its discharge.

Valves at the drip plugs are provided, which remain closed during the intervals between pump operations to prevent leak from the distributing system.

In the preferred embodiment of the present invention, an accumulator device is adapted to receive lubricant from a continuously discharging pump, such as the gear pump of an automobile engine.

This accumulator device may take the form of an air bell.

Although the accumulator may be connected to the system when being charged by the continuously operating rotary pump, it has been found most satisfactory to disconnect such accumulator from the system when it is being charged and then to disconnect it from the pump and connect it to the system when a predetermined pressure has been reached in, and/or a predetermined volume of lubricant has been forced into, the accumulator.

Although one or both of these operations of first connecting the accumulator to the pump and then connecting it to the distributing system may be carried out manually, these operations may be carried out automatically so that the accumulator will be charged with a predetermined volume of lubricant or to a predetermined pressure automatically at regular intervals during the operation of the vehicle.

The single figure illustrates an arrangement for feeding an accumulator from the engine structure, which accumulator supplies a chassis lubrication system from the engine oil pump. In the specific embodiment shown, the engine oil pump 308 serves to pump lubricant into an air bottle 309 from which the oil passes to the bearings. A pipe 310 leads from the delivery side of the pump to a two-way valve 311 communicating with the normal engine lubricating piping 313, through return pipe 312.

The other outlet 314 of the two-way valve is connected to a pipe 315 running to a two-way valve 316, spring-held, as shown. An outlet 317 from valve 316 leads to the closed air bottle 309 which in the position of the valve shown, is connected through pipe 318 to the chassis pipe line (not shown). Valves 311 and 316 are preferably linked together or constructed in one piece, so that they are rotated simultaneously by the operator. The two valves 311 and 316 are operated together by means of a linkage 311a, 316a and 311b, the linkage being shown in one position in solid lines with the chamber 30 as discharging to the bearings, and in dot and dash lines in another position with the chamber receiving lubricant from the pump 308 and being cut off from the bearings.

When the operator rotates valves 311 and 316 from the position shown in the drawing, the ports on valve 311 come into the position where the oil delivery line from the engine oil pump is connected to the vertical pipe 315. The ports of valve 316 disconnect the chassis pipe line from the tank and connect the latter to the vertical pipe 315. In this position, engine oil is forced by the engine pump 308 into the tank 309, compressing the air above the oil. Preferably, a small duct 319 is provided in the valve 311 to communicate with the engine oiling piping, so that a fraction of the normal supply passes therethrough, thus avoiding the total cessation of forced lubrication to the engine, during the period that the air bottle is being charged. This charging operation occurs rapidly, the operator retaining the valves in charging position for but a short interval and then releases them to allow the valves to return to the position shown in the drawing. The compressed air in the air bottle or oil bell 309 forces the oil therein through the chassis pipe line, through relief valves near the bearings which may be associated with measuring valves.

It will be seen that there is provided an installation that avoids the possibility of draining the engine sump through loose chassis bearings, which might occur if the engine oil pump were connected for any substantial length of time, for substantially unrestricted feed, particularly to loose chassis bearings. In the present embodiment, the oil pump serves to store energy in oil for the chassis bearings, that is, to produce a potential as distinguished from a kinetic pressure head for propelling the oil to the bearings, and specifically, as already described, to pump oil to an air bottle, the expansion of the confined air furnishing the energy for propelling the oil to the bearings.

The pressure of the engine oil pump 308 is sufficient to substantially immediately charge the air bell 309 when the interconnected valves 311 and 316 are opened by the operator or by other mechanisms around the automobile. The charge of lubricant in the air bell 309 will be determined by the pressure of the engine oil pump 308, if the valve is kept open until equilibrium is obtained between the air bell and engine oil pressure, and at constant engine oil pressures and at constant temperatures, if such is done, a predetermined and constant shot of lubricant will be accumulated in the air bell 309, which shot of lubricant may then be discharged to the lubricating line.

In the air bell device 309 of the single figure a greater charge of oil will be placed in the air bell at lower temperatures due to the contraction of the air at decreased temperature, while on the other hand a decreased volume of lubricant will be placed in said bell at summer temperature due to the expansion of the air with increased temperatures.

All the lubricant that accumulates in the air bell 309 is discharged to the bearings so that a greater volume of lubricant will be available in winter than in summer.

To accomplish this result the valves 311 and 316 should be maintained in position to connect the engine oil pump 308 to the air bell 309 for a period sufficient to allow the pressure in the air bell to build up to the maximum which may be generated by the pump.

The single figure of the drawing of the present application corresponds to Fig. 25 of application Serial No. 596,856, Patent No. 2,017,848, of which the present application is a continuation in part.

What is claimed is:

A lubricating system comprising a source of lubricant, an accumulator device, piping fed from said device, a pump receiving lubricant from said source and forcing it into the accumulator device, manually controlled valve means for controlling the amount of lubricant forced to said accumulator device from said pump, an outlet from the accumulator device, and a valve controlling said outlet automatically actuated to establish communication between the device and piping when said first mentioned valve means is actuated to cut off communication between the pump and device.

GEORGE BIJUR,
*Executor of the Estate of Joseph Bijur, Deceased.*